UNITED STATES PATENT OFFICE.

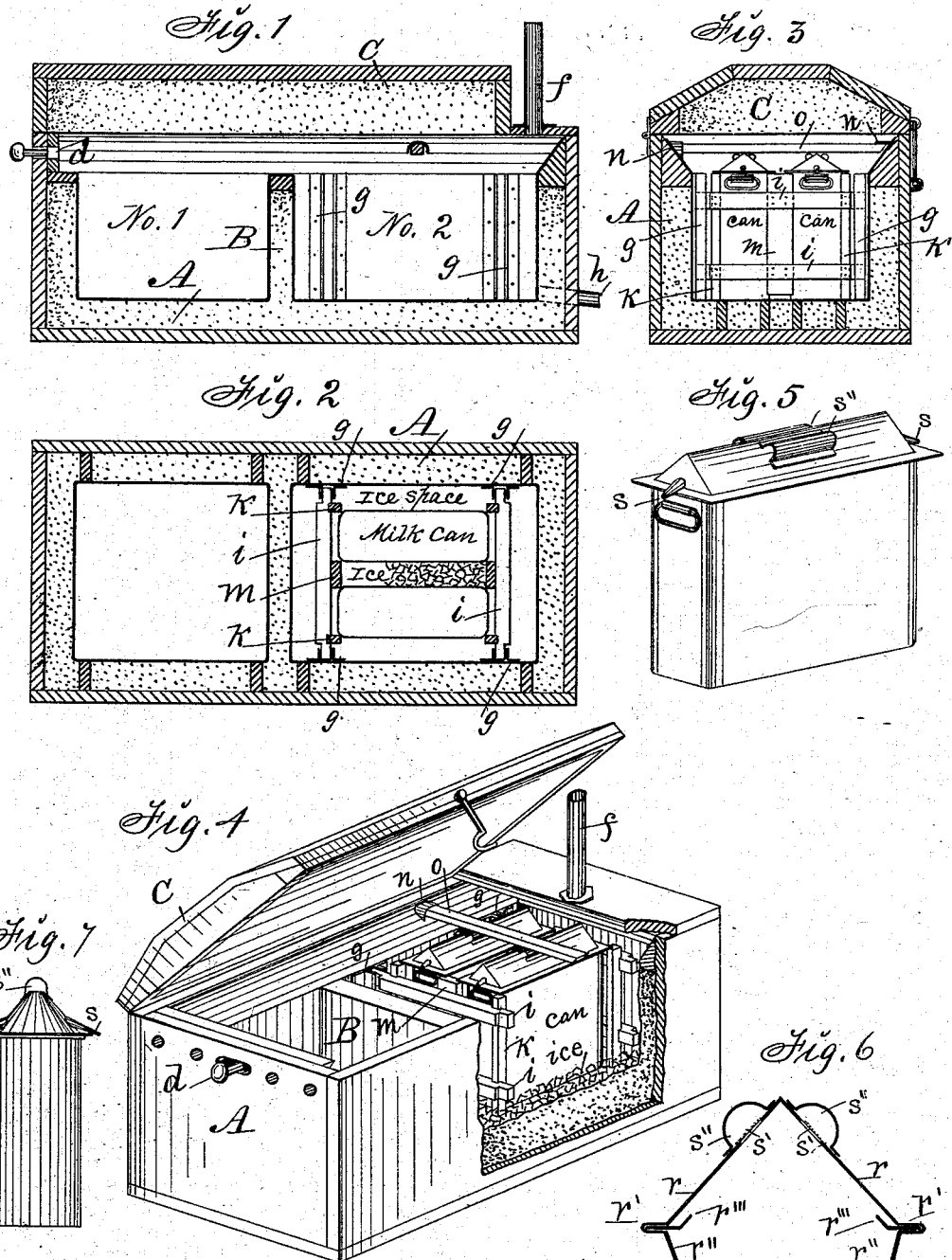

JUDAH W. IRISH, OF KELLOGG, IOWA, ASSIGNOR OF ONE-HALF TO C. J. IRISH AND H. M. COX, OF SAME PLACE.

MILK-COOLER.

SPECIFICATION forming part of Letters Patent No. 276,590, dated May 1, 1883.

Application filed October 19, 1882. (No model.)

*To all whom it may concern:*

Be it known that I, JUDAH W. IRISH, of Kellogg, in the county of Jasper and State of Iowa, have invented an Improved Milk-Cooler, of which the following is specification.

The object of my invention is to save time and labor in taking care of milk, to facilitate the extraction of latent animal heat and foul odors therefrom, and to increase the quantity and improve the quality of the cream and butter made therewith.

It consists in forming, arranging, and combining an ice-box or refrigerator, two or more milk-cans, and detachable can-holding frames, as hereinafter fully set forth.

Figure 1 of my accompanying drawings is a side view of a vertical half-section of my refrigerator. Fig. 2 is a horizontal section. Fig. 3 is a transverse section. Fig. 4 is a perspective view of my complete apparatus, showing parts of the refrigerator-box removed. Fig. 5 is a perspective view of one of my milk-cans. Fig. 6 is a transverse section of one of my can-covers. Fig. 7 shows my can-cover adapted for and applied to a round vessel. Jointly considered, these figures clearly illustrate the construction and operation of my complete invention.

A represents a double-walled refrigerator-box, that is oblong in form, has square corners, and may vary in size as desired. The frame and the outside surface is wood, and the inside wall or lining is preferably sheet-zinc. The space within the double walls is filled with charcoal or suitable material and non-conductor of heat.

B is a transverse central partition, that divides the box into two compartments, Nos. 1 and 2.

C is a hinged cover, that conforms in size and shape with the box.

$d$ is a register in the end and top portion of the box to admit fresh air.

$f$ is an eduction-tube at the opposite end of the box, adapted to carry off the heat, odors, and vitiated air that rises from the milk. It may extend to a flue in a building, to be connected therewith to prevent the impure air from being diffused and inhaled by persons in the building.

$g$ $g$ are strips of sheet metal, that have their edges bent at right angles, and are fixed against the inside walls to form bearings within which to slide my detachable can-holding frames.

$h$ is an eduction tube or faucet at the end and bottom of the box, through which ice-water is drawn off.

$i$ $i$ are wooden bars, that correspond in length with the width of the inside measurement of the box. They have tenons on their ends, or are so formed as to adapt their ends to fit in the bearings $g$, when they are fixed to upright bars $k$, to form a rectangular frame adapted to slide in and out of the bearings and box. These uprights $k$ are fixed about four inches from the ends of the bars $i$, so that their inner edges will form bearings to engage the milk-cans and to produce a vacant space of about six inches in width between the milk-can and the inside wall-face of the box. The bearings $g$ retain the skeleton frames an equal distance from the end walls of the compartment No. 1.

$m$ is a board about six inches wide, fixed to the centers of the bars $i$ in a vertical position to produce shoulders to engage the inside corners of two oblong cans when placed in parallel position within the chamber No. 2 and against the uprights $k$, as clearly shown in Fig. 4, and also to produce a vacant space between the two cans for the reception of ice and to aid in retaining the cans firmly in place within the refrigerator-box.

$n$ $n$ are hooks or catch devices fixed on opposite sides of the chamber No. 2, and at the top portions of the walls of the box, to receive and retain a detachable cross-bar, $o$, as clearly shown in Figs. 3 and 4, for the purpose of fastening the covers of the milk-cans and the cans in the ice box or chamber No. 2.

$r$ $r$ represent the inclined sides and gable-roof and cover of a can.

$r'$ is a continuous flange, formed at the base of the cover by doubling the sheet metal, as clearly shown in Fig. 6, to extend horizontally over the top edge of a can.

$r''$ is a continuous rim, extending downward and slightly inclined inward to enter and fit against the inside of the top of the can.

$r'''$ is an elbow-shaped strip of sheet metal, that has one edge placed and fixed between the doubled metal and flange $r''$ in such a manner that its opposite edge will be extended upward and inward to produce a continuous gutter, into which the condensed vapors rising from the milk will be gathered as they form upon and descend from the inclined under surfaces of the cover.

$s\ s$ represent eduction ports or tubes, connected with the cover at its opposite ends or sides in such a manner as to be adapted to admit air to the milk and convey the condensed and foul matter from the gutter and away from the milk and can.

$s'$ are openings in the top portion of the cover, through which vitiated air ascends. They are covered with wire-gauze to prevent flies and other insects from entering, and also have arched shields $s''$ fixed over them to exclude dust, and to serve as catches or handles for lifting the cover.

In the practical use of my invention I simply place the detachable skeleton frames in their bearings to retain them in the ice-box, and set the milk-cans between them, so that their corners will be engaged by the shoulders formed by the uprights in the frames. I then fill the cans with fresh milk, place the covers upon them, and lock the covers to the cans and the cans in the ice-box by means of the detachable cross-bar. I then saw ice into blocks adapted in form and size to be slipped down in the vacant spaces around and between the cans, or break the ice into irregular-shaped pieces and drop them in the spaces. I next close the cover of the refrigerator upon the cans and open the register at the end and top to admit pure air to enter and circulate through the refrigerator to aid in carrying off animal heat and foul vapor from the milk through the eduction-tube at the opposite end and top of the ice-box and refrigerator. When the milk has cooled and the cream formed I unlock the cans and place them in compartment No. 1 until wanted, and put other cans and fresh milk in their place, after cleaning the ice-box and replacing the detachable frames.

I am aware that a conical cover for milk-cans has been provided with covered ventilators for the circulation of air, and that a rim or gutter has been fixed to the inside of the wall of a steam-condensing vessel, and a tube extended outward through the same wall to convey condensed steam from a conical diaphragm or cover placed in the vessel or condenser and over the gutter fixed to the vessel in such a manner that the condensed steam collected on the cover flowed therefrom and into the fixed gutter on the wall, and from thence out of the vessel through the tube fixed to the vessel; but my manner of forming and combining a gutter and tube direct, with a detachable cover to convey condensed vapor direct from the cover of a milk-can and away from the vessel and milk therein, is novel and greatly advantageous.

I claim as my invention—

1. The refrigerator or ice-box A, having fixed bearings $g\ g$, and the detachable frames $i\ i\ k\ m$, constructed and combined substantially as shown and described, for the purposes specified.

2. The milk-can cover $r\ r$, having a flange, $r'$, a rim, $r''$, a gutter, $r'''$, inserted in the folds of the flange $r'$, ports or tubes, $s$, openings $s'$, and arched shields $s''$, substantially as shown and described, for the purposes specified.

JUDAH W. IRISH.

Witnesses:
J. R. CHANDLER,
M. I. COOPER.